United States Patent
Munechika

(10) Patent No.: US 9,639,198 B2
(45) Date of Patent: May 2, 2017

(54) SEMICONDUCTOR DEVICE

(71) Applicant: Synaptics Japan GK, Tokyo (JP)

(72) Inventor: Isao Munechika, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 206 days.

(21) Appl. No.: 14/146,767

(22) Filed: Jan. 3, 2014

(65) Prior Publication Data

US 2014/0204041 A1 Jul. 24, 2014

(30) Foreign Application Priority Data

Jan. 24, 2013 (JP) .................................. 2013-011071

(51) Int. Cl.
*G06F 3/041* (2006.01)
*G09G 5/00* (2006.01)
*G06F 1/32* (2006.01)

(52) U.S. Cl.
CPC .......... *G06F 3/0416* (2013.01); *G06F 1/3265* (2013.01); *G06F 3/0412* (2013.01); *G09G 5/008* (2013.01); *G09G 2354/00* (2013.01); *Y02B 60/1242* (2013.01)

(58) Field of Classification Search
CPC .................................................. G06F 3/0412
See application file for complete search history.

(56) References Cited

U.S. PATENT DOCUMENTS

2009/0256810 A1\* 10/2009 Pasquariello ......... G06F 3/0421
  345/173
2012/0056835 A1   3/2012 Choo et al.
2013/0241868 A1\* 9/2013 Kim ..................... G09G 3/3685
  345/174

FOREIGN PATENT DOCUMENTS

JP   2012-059265 A   3/2012

\* cited by examiner

*Primary Examiner* — Kent Chang
*Assistant Examiner* — Scott Au
(74) *Attorney, Agent, or Firm* — Miles & Stockbridge P.C.

(57) ABSTRACT

A semiconductor device connected to the display panel including the in-cell type touch sensor is configured as follows. The semiconductor device includes a driving circuit of the display panel, a touch sensing circuit of the touch sensor, a power supply circuit that supplies a power source to these circuits, and a bias control circuit that controls a bias current flowing through these circuits. The semiconductor device is able to perform a time-division operation in which one frame period of display is divided into a plurality of display driving periods and sensing periods. In the display driving periods, the supply of power to the touch sensing circuit is suppressed, and/or a bias current is reduced. In the sensing periods, the supply of power to the driving circuit is suppressed, and/or a bias current is reduced.

19 Claims, 11 Drawing Sheets

SEMICONDUCTOR DEVICE

CROSS-REFERENCE TO RELATED APPLICATIONS

The Present application claims priority from Japanese application JP 2013-011071 filed on Jan. 24, 2013, the content of which is hereby incorporated by reference into this application.

BACKGROUND

The present invention relates to a display driver and a touch control circuit of a display panel having a touch sensor mounted thereon, and particularly relates to a display driver and a touch control circuit which are capable of being suitably used for a reduction in power consumption of a circuit.

Hitherto, on-cell types in which a display panel and a touch panel are independent of each other have been the mainstream. However, in recent years, in-cell types capable of achieving a further reduction in thickness in which a display panel and a touch panel are integrated with each other have been widespread, particularly, in mobile panel modules. Since the display panel and the touch sensor are independent of each other in on-cell types, independent-type separate chips are also mainly used for the display driver and the touch controller. In the separate chips, display driving and sensing are generally performed in an asynchronous manner. On the other hand, since the display panel and the touch sensor share circuits in the in-cell types, display driving and sensing cannot be performed simultaneously, and thus types in which display driving and sensing are performed alternately in a time-division manner have been proposed.

JP-A-2012-59265 discloses a display device in which a touch sensor and a display element of an in-cell type are operated alternately in a time-division manner and a method of driving the same. The sensing of the touch sensor and the driving of the display element are performed alternately in a time-division manner. This is a system in which one frame is divided into a display mode and a touch sensing mode, and a gate driver, a data driver and a touch controller are controlled by a timing controller so that both the modes are executed alternately. In this system, the high accuracy of touch detection is realized by intermittently performing image display for each of several lines, and performing touch sensing in a period in which image output from a display driver is stopped. Since noise of a signal for driving the display element is not mixed into a detection signal of the touch sensor, the influence of noise can be alleviated.

SUMMARY

As a result of the examination of JP-A-2012-59265 by the inventor, it is known that there is the following new problem.

Since a display period of an image frame is divided into a display driving period and a sensing period, an operation is required to be performed in each of the display driving period and the sensing period within shorter time than in a case where an operation is performed simultaneously and concurrently without time division. Accordingly, a circuit operating more rapidly is required to be adopted in a display driver and a touch sensing circuit. In order to speed up a circuit, an element having a large element size and high current driving capability is adopted, and thus power consumption becomes large. Further, a power supply circuit that supplies a power source to these circuits is required to be provided with power supply capability having a margin even at the moment in case that power consumption becomes maximum. In addition, as a bias current supplied to various types of circuits in a display driver and a touch control circuit, a bias current of a current value having a margin even at the moment in case that operation speed becomes highest is supplied.

The present invention is contrived in view of such circumstances, and an object thereof is to suppress an increase in power consumption in a display driver and a touch control circuit of a display panel having an in-cell type touch sensor mounted thereon, even in case that the display driver and the touch control circuit are brought into operation in a time-division manner.

The above and other problems and novel features of the present invention will be made clearer from the description and the accompanying drawings of this specification.

According to an embodiment, a configuration is as follows.

That is, a semiconductor device connected to a display panel including an in-cell type touch sensor is configured as follows. The semiconductor device includes a driving circuit capable of driving the display panel, a touch sensing circuit which is connected to the touch sensor, a power supply circuit that supplies a power source to the driving circuit and the touch sensing circuit, and a bias control circuit that controls bias currents flowing through the driving circuit and the touch sensing circuit. The semiconductor device is able to perform a time-division operation including a display driving period in which the display panel is driven and a touch state is not detected and a sensing period in which a touch state is detected and a driving state of the display panel is not changed. One or more display driving period and one or more sensing periods are included in one frame period of an image which is displayed by the display panel. The touch sensing circuit is set to be in a low power consumption state in the display driving period, and the driving circuit is set to be in a low power consumption state in the sensing period. For example, in the display driving period, power supply capability to the touch sensing circuit is reduced further than that in the sensing period, and/or the bias control circuit reduces the bias current of the touch sensing circuit further than that in the sensing period. In the sensing period, power supply capability to the driving circuit is reduced further than that in the display driving period, and/or the bias current of the driving circuit is reduced further than that in the display driving period.

A brief description of an effect obtained by the embodiment is as follows.

That is, even in case that a display driver and a touch control circuit of the display panel having an in-cell type touch sensor mounted thereon are brought into operation in a time-division manner, it is possible to keep power consumption low.

DETAILED DESCRIPTION

1. Summary of the Embodiments

Figure 1:
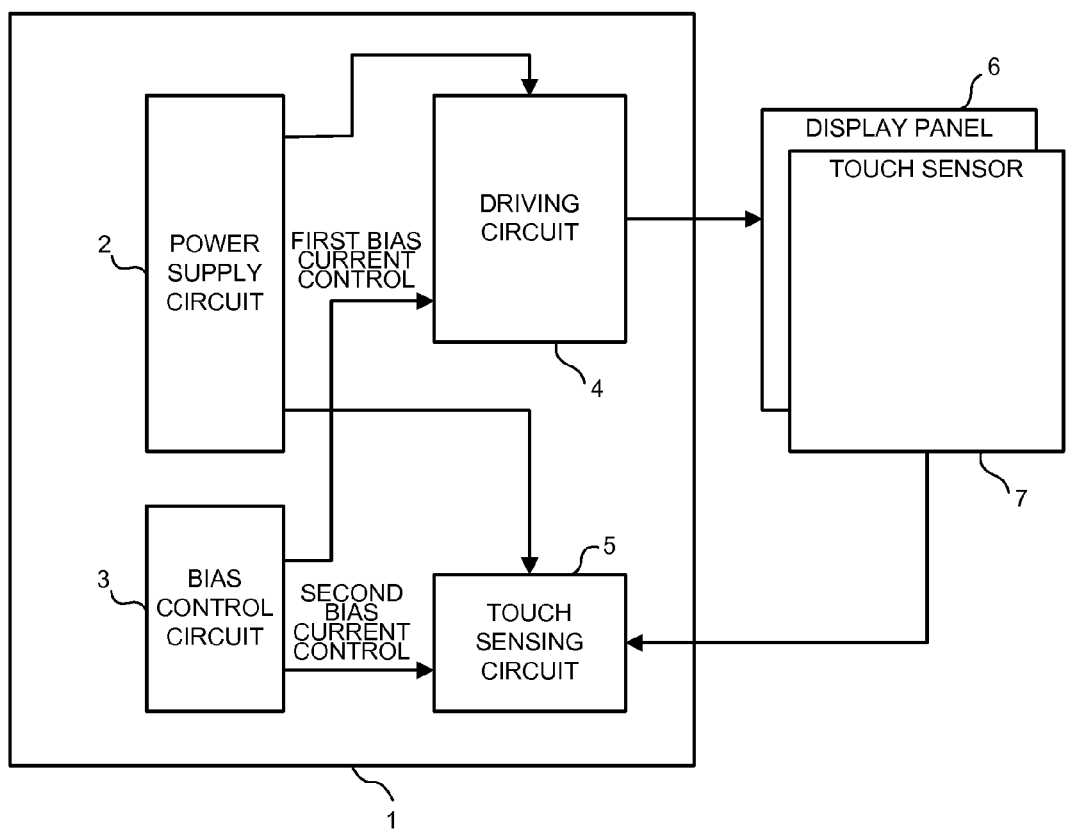
FIG. 1 is a block diagram illustrating an outline of a semiconductor device according to a typical embodiment.

First, the summary of typical embodiments disclosed in the present application will be described. Reference numerals and signs in the drawings that refer to with parentheses applied thereto in the description of the summary of the typical embodiments are merely illustrative of what are included in the concepts of components marked with the reference numerals and signs.

[1]<Reduction in Power Consumption of Display Driver+Touch Controller>

A semiconductor device (1) according to a typical embodiment disclosed in this application is configured as follows. The semiconductor device can be connected to a display panel (6) including a touch sensor (7). The semiconductor device includes a driving circuit (4) capable of driving the display panel, a touch sensing circuit (5) which is connected to the touch sensor, a power supply circuit (2) that supplies a power source to the driving circuit and the touch sensing circuit, an a bias control circuit (3) that controls a first bias current flowing through the driving circuit and a second bias current flowing through the touch sensing circuit.

In the semiconductor device (1), a time-division operation can be performed including a display driving period in which the display panel is driven and a touch state is not detected and a sensing period in which the touch state is detected and the driving state of the display panel is not changed, and one frame period of an image displayed by the display panel includes one or more display driving periods and one or more sensing periods.

In the display driving period, the power supply circuit reduces power supply capability to the touch sensing circuit further than that in the sensing period, and/or the bias control circuit reduces the second bias current further than that in the sensing period.

In the sensing period, the power supply circuit reduces power supply capability to the driving circuit further than that in the display driving period, and/or the bias control circuit reduces the first bias current further than that in the display driving period.

Thereby, even in case that a display driver and a touch control circuit of the display panel having an in-cell type touch sensor mounted thereon are brought into operation in a time-division manner, it is possible to keep power consumption low.

[2]<Boost Clock Frequency of DCDC+Bias Current of Regulator>

In paragraph 1, the power supply circuit includes a DCDC converter (13) that generates an internal power source from a power source which is supplied from an outside, a first regulator (15_1 and 15_2) that outputs a first stabilized power source, supplied to the driving circuit, from the internal power source, and a second regulator (15_3) that outputs a second stabilized power source, supplied to the touch sensing circuit, from the internal power source.

The DCDC converter is able to improve power supply capability by increasing the frequency of a boost clock, and to reduce power supply capability by decreasing the frequency thereof. The first regulator is able to improve power supply capability by increasing a third bias current controlled by the bias control circuit, and to reduce power supply capability by decreasing the third bias current. The second regulator is able to improve power supply capability by increasing a fourth bias current controlled by the bias control circuit, and to reduce power supply capability by decreasing the fourth bias current.

In the display driving period, the power supply circuit decreases the frequency of the DCDC converter further than that in the display driving period, and the bias control circuit reduces the fourth bias current and the second bias current further than those in the sensing period. In the sensing period, the power supply circuit decreases the frequency of the DCDC converter further than that in the display driving period, and the bias control circuit reduces the third bias current and the first bias current further than those in the display driving period.

Thereby, it is possible to control the power supply capability of the DCDC converter and the regulator constituting the power supply circuit with high speed and efficiency, and to improve the S/N ratio of touch sensing by reducing the generation of noise caused by the boost clock of the DCDC converter.

[3]<Duty of Boost Clock of DCDC+Bias Current of Regulator>

In paragraph 1, the power supply circuit includes a DCDC converter (13) that generates an internal power source from a power source which is supplied from an outside, a first regulator (15_1 and 15_2) that outputs a first stabilized power source, supplied to the driving circuit, from the internal power source, and a second regulator (15_3) that outputs a second stabilized power source, supplied to the touch sensing circuit, from the internal power source.

The DCDC converter is able to improve power supply capability by increasing the duty of a boost clock, and to reduce power supply capability by decreasing the duty thereof. The first regulator is able to improve power supply capability by increasing a third bias current controlled by the bias control circuit, and to reduce power supply capability by decreasing the third bias current. The second regulator is able to improve power supply capability by increasing a fourth bias current controlled by the bias control circuit, and to reduce power supply capability by decreasing the fourth bias current.

In the display driving period, the power supply circuit decreases the duty of the DCDC converter further than that in the display driving period, and the bias control circuit reduces the fourth bias current and the second bias current further than those in the sensing period. In the sensing period, the power supply circuit decreases the duty of the DCDC converter further than that in the display driving period, and the bias control circuit reduces the third bias current and the first bias current further than those in the display driving period.

Thereby, it is possible to control the power supply capability of the DCDC converter and the regulator constituting the power supply circuit with high speed and efficiency, and to improve the S/N ratio of touch sensing by reducing the generation of noise caused by the boost clock of the DCDC converter in the sensing period.

[4]<A Plurality of DCDC Converters and a Plurality of Regulators>

In paragraph 1, the power supply circuit includes a first DCDC converter (13_1) that generates a first internal power source from a power source which is supplied from an outside, a second DCDC converter (13_2) that generates a second internal power source from the first internal power source, and a third DCDC converter (13_3) that generates a third internal power source from the first internal power source. The power supply circuit includes a first regulator (15_1) that outputs a second stabilized power source, supplied to the driving circuit and the touch sensing circuit, from the second internal power source, and a second regulator (15_2) that outputs a third stabilized power source, which is supplied to the driving circuit and is not supplied to the touch sensing circuit, from the third internal power source.

Each of the first, second and third DCDC converters is able to improve power supply capability by increasing the frequency and/or duty of a boost clock, and to reduce power supply capability by decreasing the frequency and/or duty thereof. The first regulator is able to improve power supply capability by increasing a third bias current controlled by the bias control circuit, and to reduce power supply capability by decreasing the third bias current. The second regulator is able to improve power supply capability by increasing a fourth bias current controlled by the bias control circuit, and to reduce power supply capability by decreasing the fourth bias current, or cut off the supply of power.

In the sensing period, the power supply circuit reduces power supply capability by decreasing the frequency and/or duty of the boost clock of the first DCDC converter and the second DCDC converter and stops an operation of the third DCDC converter, and the bias control circuit stops the supply of power to the driving circuit from the second regulator by decreasing the fourth bias current.

Thereby, in the semiconductor device having the driving circuit and the touch sensing circuit integrated together, even in case that the power supply circuit (s) is (are) included in a sharing or dispersion manner, it is possible to appropriately control power supply capability.

[5]<Time-Division Operation for Each of a Plurality of Lines>

In any one of paragraphs 1 to 4, the display panel can display an image frame constituted by a plurality of lines. The display driving period is a period in which some of a plurality of lines within the image frame are displayed, and the sensing period is set to an arbitrary period between the display driving period and the next display driving period.

Thereby, in the display driver and the touch control circuit of the display panel having an in-cell type touch sensor mounted thereon, even in case that display driving and sensing are performed in a time-division manner for each of a plurality of lines, it is possible to keep power consumption low.

[6]<Display Driver IC>

The semiconductor device (1) according to the typical embodiment disclosed in this application is configured as follows. The semiconductor device can be connected to a display panel (7), and includes a driving circuit (4) capable of driving the display panel, a power supply circuit (2) that supplies a power source to the driving circuit, and a bias control circuit (3) that controls a bias current flowing through the driving circuit. A time-division operation can be performed including a display driving period in which the display panel is driven and a waiting period in which a driving state is not changed, and one frame period of an image displayed by the display panel includes one or more display driving periods and one or more waiting periods.

In the waiting period, the power supply circuit is able to perform control for reducing power supply capability further than that in the display driving period, and/or the bias control circuit is able to perform control for reducing the bias current further than that in the display driving period.

Thereby, even in case that the display driver of the display panel having an in-cell type touch sensor mounted thereon is brought into intermittent operation, it is possible to keep power consumption low.

[7]<Boost Clock Frequency of DCDC+Bias Current of Regulator>

In paragraph 6, the power supply circuit includes a DCDC converter (13) that generates an internal power source from a power source which is supplied from an outside, and a regulator (15) that outputs a stabilized power source from the internal power source.

The DCDC converter is able to improve power supply capability by increasing the frequency of a boost clock, and to reduce power supply capability by decreasing the frequency thereof. Using the bias current as a first bias current, the regulator is able to improve power supply capability by increasing a second bias current controlled by the bias control circuit, and to reduce power supply capability by decreasing the second bias current.

In the waiting period, the power supply circuit decreases the frequency of the DCDC converter further than that in the display driving period, and the bias control circuit reduces the second bias current and the first bias current further than those in the display driving period.

Thereby, it is possible to control the power supply capability of the DCDC converter and the regulator constituting the power supply circuit with high speed and efficiency.

[8]<Duty of Boost Clock of DCDC+Bias Current of Regulator>

In paragraph 6, the power supply circuit includes a DCDC converter (13) that generates an internal power source from a power source which is supplied from an outside, and a regulator (15) that outputs a stabilized power source from the internal power source.

The DCDC converter is able to improve power supply capability by increasing the duty of a boost clock, and to reduce power supply capability by decreasing the duty thereof. Using the bias current as a first bias current, the regulator is able to improve power supply capability by increasing a second bias current controlled by the bias control circuit, and to reduce power supply capability by decreasing the second bias current.

In the waiting period, the power supply circuit can perform control for decreasing the duty of the DCDC converter further than that in the display driving period, and the bias control circuit can perform control for reducing the second bias current and the first bias current further than those in the display driving period.

Thereby, it is possible to control the power supply capability of the DCDC converter and the regulator constituting the power supply circuit with high speed and efficiency.

[9]<Fixation of Boost Clock of DCDC+Bias Current of Regulator>

In paragraph 6, the power supply circuit includes a DCDC converter (13) that generates an internal power source from a power source which is supplied from an outside, and a regulator (15) that outputs a stabilized power source from the internal power source.

The DCDC converter is able to improve power supply capability by increasing the frequency or the duty of a boost clock, and to reduce power supply capability by decreasing the frequency or the duty thereof. Using the bias current as a first bias current, the regulator is able to improve power supply capability by increasing a second bias current controlled by the bias control circuit, and to reduce power supply capability by decreasing the second bias current.

In the waiting period, the power supply circuit fixes a signal level of the boost clock of the DCDC converter, and the bias control circuit reduces the second bias current and the first bias current further than those in the display driving period.

Thereby, in the waiting period, it is possible to stop the supply of power to an unnecessary driving circuit, and to minimize a bias current.

[10]<Combination of a Plurality of Low Power Consumption Operations>

In paragraph 6, the power supply circuit includes a first DCDC converter (13_1) that generates a first internal power source from a power source which is supplied from an outside, a second DCDC converter (13_2) that generates a second internal power source from the first internal power source, and a regulator (15) that outputs a stabilized power source from the second internal power source.

Each of the first and second DCDC converters is able to improve power supply capability by increasing the frequency or the duty of a boost clock, and to reduce power supply capability by decreasing the frequency or the duty thereof. Using the bias current as a first bias current, the regulator is able to improve power supply capability by increasing a second bias current controlled by the bias control circuit, and to reduce power supply capability by decreasing the second bias current.

In the waiting period, the power supply circuit decreases the frequency of the first DCDC converter further than that in the display driving period, and/or decreases the duty further than that in the display driving period, and fixes a signal level of the boost clock of the second DCDC converter. The bias control circuit reduces the second bias current and the first bias current further than those in the display driving period.

Thereby, even in case that the power supply circuit is formed by combining a plurality of DCDC converters and regulators, it is possible to appropriately control power supply capability.

[11]<Time-Division Operation for Each of a Plurality of Lines>

In any one of paragraphs 6 to 10, the display panel can display an image frame constituted by a plurality of lines. The display driving period is a period in which some of a plurality of lines within the image frame are displayed, and the waiting period is set to an arbitrary period between the display driving period and the next display driving period.

Thereby, in the display driver circuit, even in case that the display driving circuit is brought into intermittent operation for each of a plurality of lines, it is possible to keep power consumption low.

[12]<Touch Controller IC>

A semiconductor device (1_2) according to the typical embodiment disclosed in this application is configured as follows. The semiconductor device can be connected to a display panel (6) including a touch sensor (7). The semiconductor device includes a touch sensing circuit (5) connected to the touch sensor, a power supply circuit (2_2) that supplies a power source to the touch sensing circuit, and a bias control circuit (3_2) that controls a bias current flowing through the touch sensing circuit. A time-division operation can be performed including a sensing period in which the touch state is detected and a waiting period in which the touch state is not detected.

One or more sensing periods and one or more waiting period are included in one frame period of an image displayed by the display panel. In the waiting period, the power supply circuit reduces power supply capability, and/or the bias control circuit reduces the bias current.

Thereby, in the touch control circuit of the display panel having an in-cell type touch sensor mounted thereon, it is possible to keep power consumption low.

[13]<Boost Clock Control of DCDC+Bias Current of Regulator>

In paragraph 12, the power supply circuit includes a DCDC converter (13_4 and 13_5) that generates an internal power source from a power source which is supplied from an outside, and a regulator (15_3) that outputs a stabilized power source from the internal power source.

The DCDC converter is able to improve power supply capability by increasing the frequency and or the duty of a boost clock, and to reduce power supply capability by decreasing the frequency and or the duty thereof. Using the bias current as a first bias current, the regulator is able to improve power supply capability by increasing a second bias current controlled by the bias control circuit, and to reduce power supply capability by decreasing the second bias current.

In the waiting period, the power supply circuit decreases the frequency of the DCDC converter further than that in the display driving period, and the bias control circuit reduces the second bias current and the first bias current further than those in the display driving period.

Thereby, it is possible to control the power supply capability of the DCDC converter and the regulator constituting the power supply circuit with high speed and efficiency, and to improve the S/N ratio of touch sensing by reducing the generation of noise caused by the boost clock of the DCDC converter.

2. Further Detailed Description of the Embodiments

The embodiments will be described in details.

[Typical Embodiment]

FIG. 1 is a block diagram illustrating an outline of a semiconductor device according to a typical embodiment.

A semiconductor device 1 according to the typical embodiment is configured as follows. The semiconductor device includes a driving circuit 4 capable of driving a display panel 6, a touch sensing circuit 5 connected to a touch sensor 7, a power supply circuit 2 that supplies a power source to the driving circuit 4 and the touch sensing circuit 5, and a bias control circuit 3 that controls a first bias current flowing through the driving circuit 4 and a second bias current flowing through the touch sensing circuit 5. For example, the semiconductor device can be connected to the in-cell type display panel 6 including the touch sensor 7 integrally. The semiconductor device 1 is formed on one semiconductor substrate such as single crystal silicon by, for example, a CMOS integrated circuit manufacturing technique or the like, or is configured such that these circuits are sealed in one package by a multi-chip, and is formed as a semiconductor module.

The display panel 6 is, for example, a liquid crystal display panel. The display panel can display an image frame constituted by a plurality of lines, and can also display a moving image by sequentially displaying an image of 30 frames per second. The driving circuit 4 drives the display panel 6 by sequentially repeating an operation for applying image data to be displayed to each pixel, for each line and for each frame. The touch sensor 7 is formed by arranging, for example, capacitors, and can detect a touch state and a position by detecting a change in capacity. The touch sensor is formed integrally with the display panel 6 in an in-cell type.

Operations of the semiconductor device 1 will be described below.

Since a touch sensor built-in display panel in which time division is performed on a display period and a sensing period decreases the driving capability of a display driver power supply in a sensing period ($T_{Touch}$) in which display driving is not performed within one frame period and does not perform sensing in a display period ($T_{Disp}$), a decrease in the power supply driving capability of a touch sensor power supply does not influence display and sensing. Therefore, it is possible to perform a low power consumption operation without deteriorating display and sensing performance.

In case that the averages of difference between power consumptions by which the driving capabilities of the display driver power supply and the touch sensor power supply are decreased are set to $\Delta W_{Touch}$ and $\Delta W_{Disp}$, respectively, the power reduction amount $\Delta W_{panel}$ of the touch sensor built-in display panel is expressed by the following expression.

$$\Delta W_{Panel} \cong \int_0^{TDisp} \Delta W_{Disp} + \int_0^{TTouch} \Delta W_{Touch}$$

In addition, by stopping an operation of the display driving power supply in the sensing period or decreasing an operating frequency, a S/N ratio can be increased by reducing operation noise of the display driving power supply during sensing, which results in an effect of improving the accuracy of touch detection.

Figure 2:
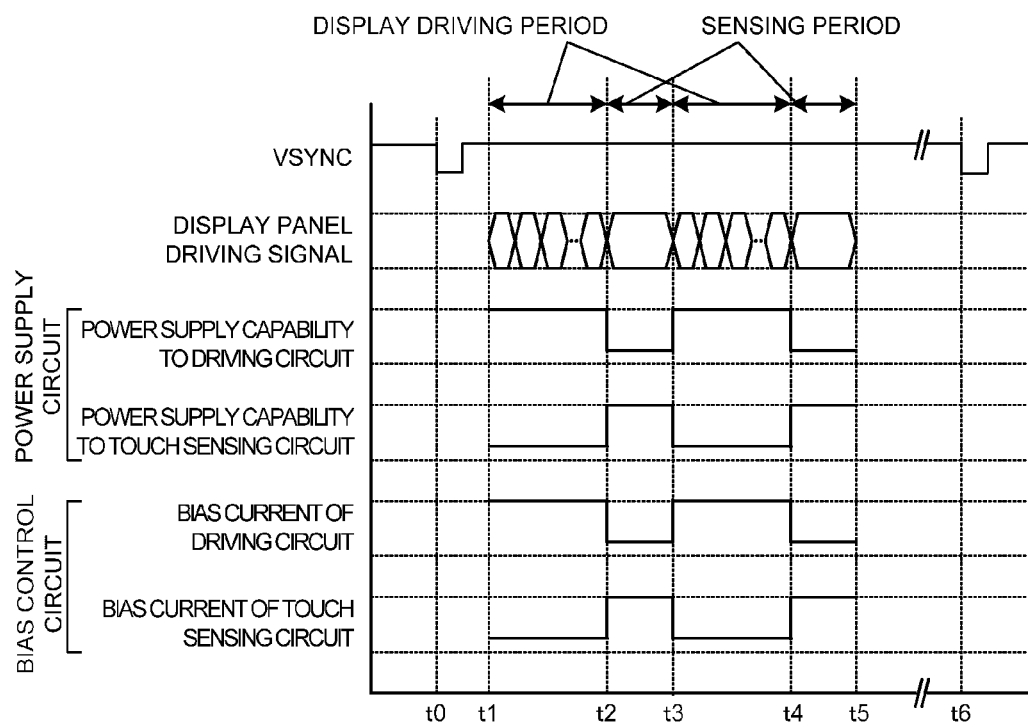
FIG. 2 is a timing diagram illustrating an operation example the semiconductor device according to the typical embodiment.

FIG. 2 is a timing diagram illustrating an operation example of the semiconductor device according to the typical embodiment. A horizontal axis represents time, and a vertical axis schematically represents, from above, a vertical synchronizing signal VSYNC, a display panel driving signal, the power supply capability of the power supply circuit 2 to the driving circuit 4 and the touch sensing circuit 5, and waveforms of a first bias current of the driving circuit 4 and a second bias current of the touch sensing circuit which are controlled by the bias control circuit 3.

The semiconductor device 1 operates in a time-division manner in which a period is divided into a display driving period in case that the display panel 6 is driven and a sensing period in case that a touch state and a position are detected by the touch sensor 7. One or more display driving period and one or more sensing periods are included in one frame period of an image displayed by the display panel 6. In the display driving period, the display panel 6 is driven, but the detection of a touch state is not performed. On the other hand, in the sensing period, a touch state is detected, but the driving state of the display panel 6 is not changed. A period from time t0 to time t6 is one frame period, a period from time t1 to t2 and a period from time t3 to time t4 are display driving periods, and a period from time t2 to time t3 and a period from time t4 to time t5 are sensing periods. As long as the sensing period is within the range of a period between the display driving periods, the sensing period can be adjusted to an arbitrary period.

In the display driving periods (times t1 to t2 and times t3 to t4), the touch sensing circuit 5 is set to be in a low power consumption state. For example, the power supply circuit 2 reduces power supply capability to the touch sensing circuit 5 further than that in the sensing period, and/or the bias control circuit 3 reduces the second bias current further than that in the sensing period. Since the touch sensing circuit 5 is not brought into operation by a time-division operation in the display driving period, it is possible to keep the supply of power and the bias current to the minimum necessary, and to suppress power consumption by stopping the supply of power and the bias current insofar as possible.

In the sensing periods (times t2 to t3 and times t4 to t5), the driving circuit 4 is set to be in a low power consumption state. For example, the power supply circuit 2 reduces power supply capability to the driving circuit 4 further than that in the display driving period, and/or the bias control circuit 3 reduces the first bias current further than that in the display driving period. Since the driving circuit 4 is not brought into operation by a time-division operation in the sensing period, it is possible to keep the supply of power and the bias current to the minimum necessary, and to suppress power consumption by stopping the supply of power and the bias current insofar as possible.

Thereby, even in case that a display driver and a touch control circuit of the display panel having an in-cell type touch sensor mounted thereon are brought into operation in a time-division manner, it is possible to keep power consumption low.

The present invention is not limited to the above-mentioned embodiment, but it goes without saying that various changes and modifications may be made without departing from the scope of the invention.

For example, the display panel may be an organic electroluminescent panel, a plasma display, and any other kinds of display panels without being limited to a liquid crystal display panel. In addition, the touch sensor may be any kinds of sensing types without being limited to a type that detects a change in capacity. Further, the display panel and the touch sensor may be an on-cell type without being limited to an in-cell type. In addition, the power supply circuit 2, the bias control circuit 3, the driving circuit 4, and the touch sensing circuit 5 may be integrated on a single semiconductor substrate, and may be formed to be divided into a plurality of semiconductor chips.

(First Embodiment)

Figure 3:
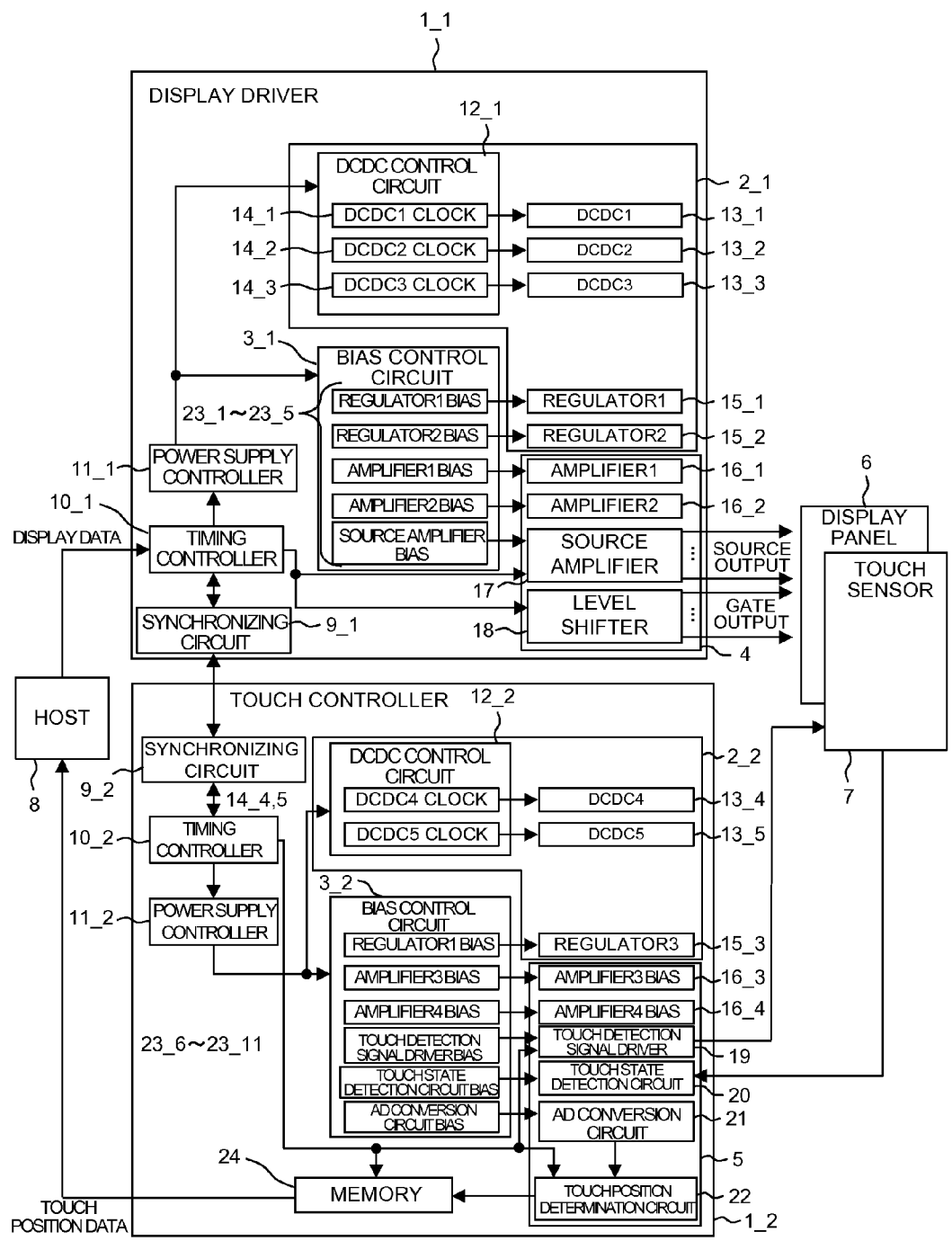
FIG. 3 is a block diagram illustrating a configuration of a semiconductor device according to First Embodiment.

FIG. 3 is a block diagram illustrating a configuration of a semiconductor device according to First Embodiment.

A semiconductor device 1 according to First Embodiment is configured to include a display driver 1_1 and a touch controller 1_2. The display driver 1_1 and the touch controller 1_2 are formed on one semiconductor substrate by, for example, a CMOS integrated circuit manufacturing technique or the like. The display driver 1_1 and the touch controller 1_2 may be sealed in one package and be formed as a semiconductor module. The display driver 1_1 drives a display panel 6 on the basis of display data which is input from a host 8, and the touch controller 1_2 discriminates between a touch state and a touch position by sensing a touch sensor 7, and outputs touch position data to the host 8. The display panel 6 is, for example, a liquid crystal display panel. The display panel can display an image frame constituted by a plurality of lines, and can also display a moving image, for example, by sequentially displaying an image 30 frames per second. The touch sensor 7 is formed by arranging, for example, capacitors, and can detect a touch state and a position by detecting a change in capacity. The touch sensor is formed integrally with the display panel 6 in an in-cell type.

The display driver 1_1 is configured to include a driving circuit 4, a power supply circuit 2_1 that supplies a power source to the driving circuit 4 and the like, a bias control circuit 3_1 that controls a bias current flowing through an analog circuit constituting the driving circuit 4 and the like, a synchronizing circuit 9_1, a timing controller 10_1, and a power supply controller 11_1. The driving circuit 4 is configured to includes a source amplifier 17 that outputs a source output signal for driving a source electrode of the display panel 6, a level shifter 18 that outputs a gate output signal for driving a gate electrode of the display panel 6, and other amplifier 1 and amplifier 2 (16_1 and 16_2). A plurality of amplifiers can be mounted, but only two amplifiers are exemplified. The power supply circuit 2_1 includes DCDC converters 1 to 3 (13_1 to 13_3), a DCDC control circuit 12_1 that supplies a boost clock to these converters, and regulators 1 and 2 (15_1 and 15_2) that stabilize internal power sources boosted and generated by the DCDC converters 1 to 3 (13_1 to 13_3). Although not shown, a power supply voltage stabilized by the regulators 1 and 2 (15_1 and 15_2) is supplied to each circuit constituting the driving circuit 4. In addition, a power source to the synchronizing circuit 9_1, the timing controller 10_1, and the power supply controller 11_1 may be supplied from the power supply circuit 2_1, may be supplied from another power supply circuit, and may be supplied from the outside. The bias control circuit 3_1 is configured to include regulators 15_1 and 15_2 of the power supply circuit 2_1, and bias circuits 23_1 to 23_5 that determine a bias current flowing through the source amplifier 17 and other amplifiers 16_1 and 16_2 of the driving circuit 4. The synchronizing circuit 9_1 is an interface circuit of a synchronous signal for synchronizing between the touch controller 1_2 and the synchronizing circuit. Display data is input to the timing controller 10_1 from the host 8, and signals (source output signal, gate output signal and the like) for driving the display panel 6 are output to the source amplifier 17 and the level shifter 18 of the driving circuit 4 at an appropriate timing. The display driver 1_1 according to First Embodiment includes the power supply controller 11_1, and performs control of a reduction in power consumption so as to control the power supply circuit 2_1 and the bias control circuit 3_1 on the basis of a timing control signal which is output from the timing controller 10_1. Further details about the control of a reduction in power consumption will be described later.

The touch controller 1_2 is configured to include a touch sensing circuit 5, a power supply circuit 2_2 that supplies a power source to the touch sensing circuit 5 and the like, a bias control circuit 3_2 that controls a bias current flowing through an analog circuit constituting the touch sensing circuit 5 and the like, a synchronizing circuit 9_2, a timing controller 10_2, and a power supply controller 11_2. The touch sensing circuit 5 is configured to include a touch detection signal driver 19 that outputs a touch detection signal applied to a touch panel 7, a touch state detection circuit 20 that detects the touch state of the touch panel 7, an AD (Analog to Digital) conversion circuit 21 that converts an analog value which is output from the touch state detection circuit 20 into a digital value, a touch position discrimination circuit 22, and other amplifiers 16_3 and 16_4. A plurality of amplifier can be mounted, but only two amplifiers are exemplified. Touch position data which is output from the touch position discrimination circuit 22 is once stored in a memory 24, and then is output to the host 8. By the touch position data being once stored in the memory 24, the host 8 can have access to the memory 24 at an arbitrary timing, to thereby read out the touch position data. The power supply circuit 2_2 includes DCDC converters 4 and 5 (13_4 and 13_5), a DCDC control circuit 12_2 that supplies a boost clock to these converters, and a regulator 15_3 that stabilizes an internal power source boosted and generated by the DCDC converter. Although not shown, a power supply voltage stabilized by the regulator 15_3 is supplied to each circuit constituting the touch sensing circuit 5. In addition, a power source to the synchronizing circuit 9_2, the timing controller 10_2, and the power supply controller 11_2 may be supplied from the power supply circuit 2_2, and may be supplied from the outside. The bias control circuit 3_2 is configured to include the regulator 15_2 of the power supply circuit 2_2, and bias circuits 23_6 to 23_11 that determines a bias current flowing through the touch detection signal driver 19, the touch state detection circuit 20, the AD conversion circuit 21, and other amplifier 163 and 16_4 of the touch sensing circuit 5. The synchronizing circuit 9_2 is an interface circuit of a synchronous signal for synchronizing between the display driver 1_1 and the synchronizing circuit. The timing controller 10_2 performs timing control of the touch detection signal driver 19, the touch state detection circuit 20, the AD conversion circuit 21, the touch position discrimination circuit 22, and the memory 24. The touch controller 1_2 according to First Embodiment includes the power supply controller 11_1, and the timing controller 10_2 performs control of a reduction in power consumption by controlling the power supply circuit 2_2 and the bias control circuit 3_2 on the basis of a timing control signal which is output from the timing controller 10_2, in addition to the above-mentioned control. Further details about the control of a reduction in power consumption will be described later.

An operation example of the semiconductor device according to First Embodiment will be described below.

Figure 4:
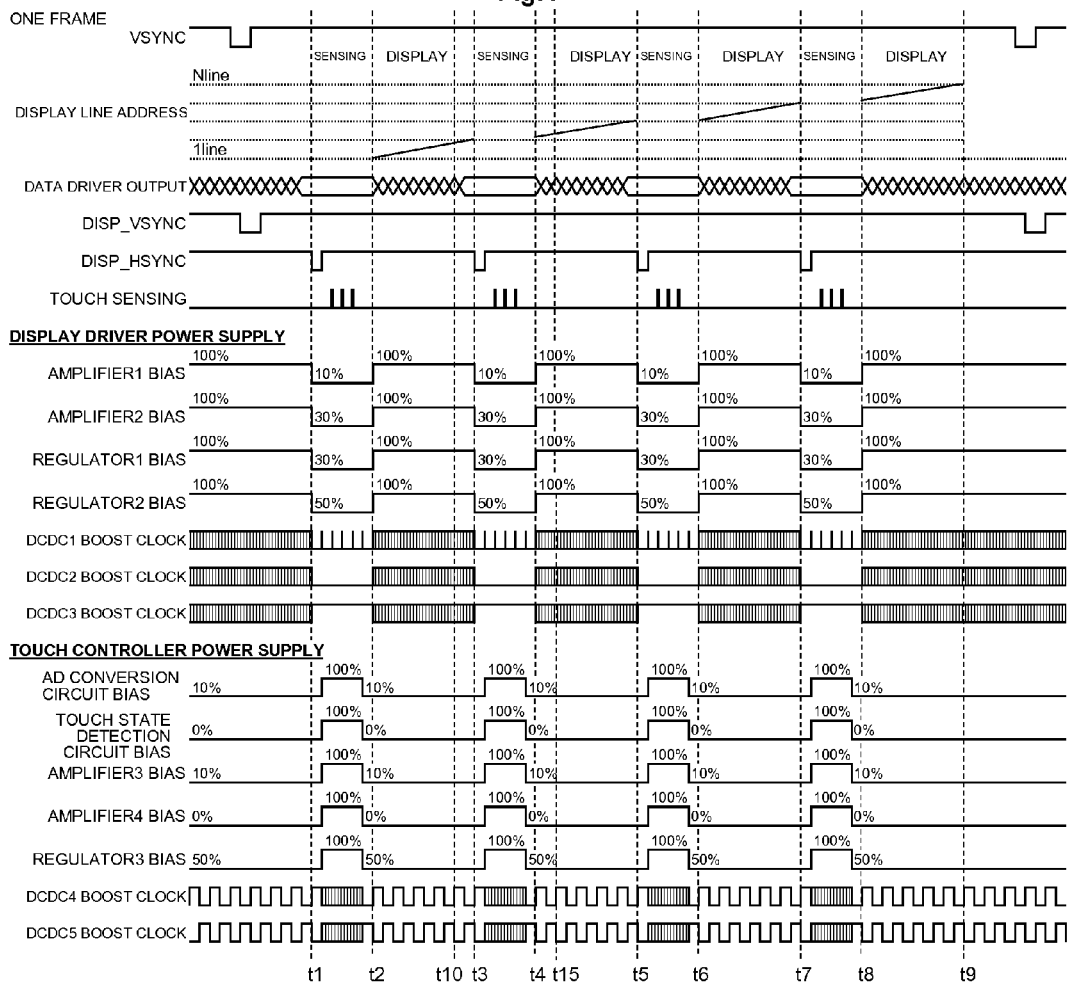
FIG. 4 is a timing diagram illustrating an operation example of the semiconductor device according to First Embodiment.
Figure 5:
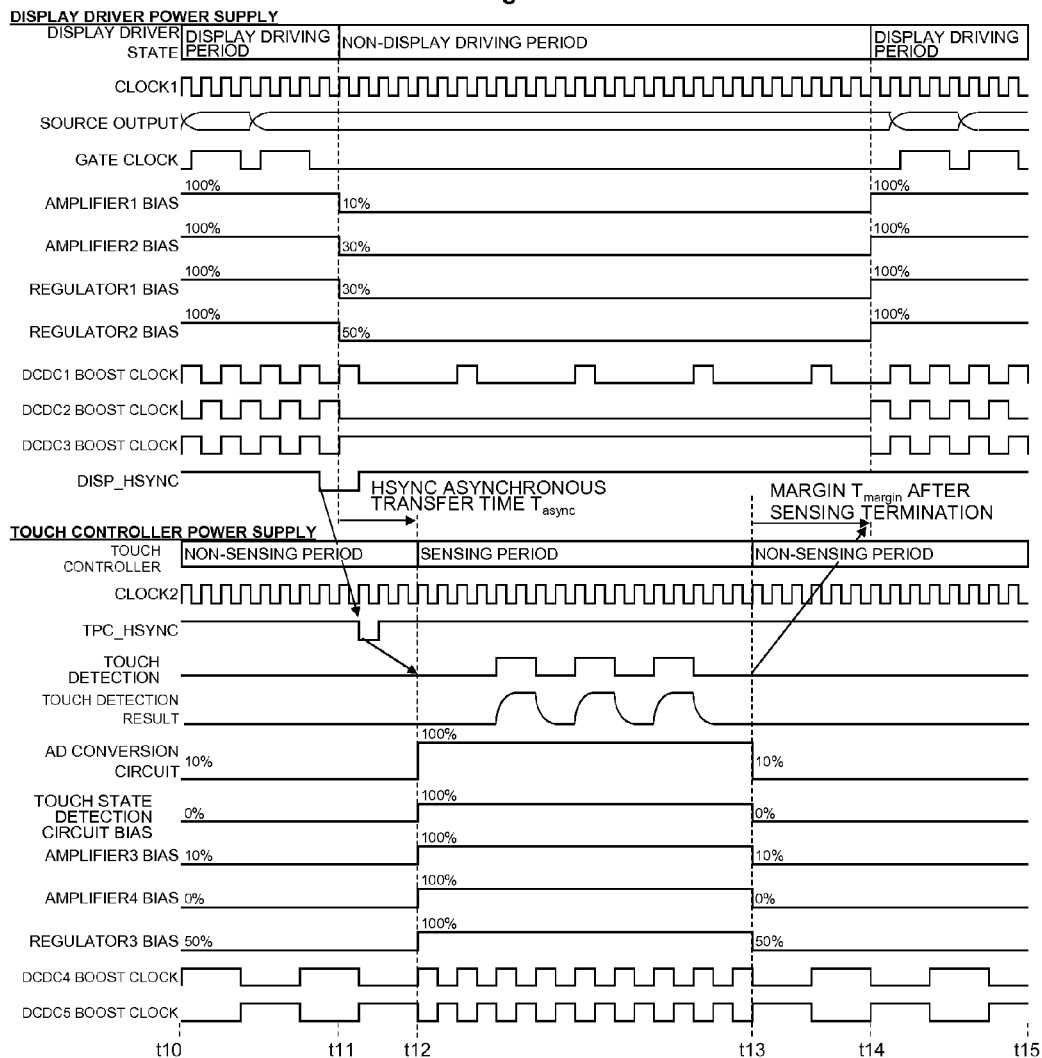
FIG. 5 is an enlarged timing diagram of a portion of FIG. 4.

FIG. 4 is a timing diagram illustrating an operation example of the semiconductor device according to First Embodiment, and FIG. 5 is an enlarged timing diagram of a portion of FIG. 4 (times t10 to t15).

In the semiconductor device 1, the timing controllers 9_1 and 9_2 of the display driver 1_1 and the touch controller 1_2 are synchronized with each other, and display driving and touch sensing are performed in a time-division manner. The timing controller 10_1 of the display driver 1_1 performs display driving intermittently for each of several lines, and generates display driving periods (t2 to t3, t4 to t5, t6 to t7, and t8 to t9) and non-display driving periods (t1 to t2, t3 to t4, t5 to t6, and t7 to t8). The touch controller 1_2 performs touch sensing in the non-display driving periods of the display driver 1_1.

In the semiconductor device 1 of the present invention, the power supply controller 11_1 of the display driver 1_1 further has a function of operating the display power supply circuit 2_1 by the timing controller 10_1 with low power consumption for a fixed period, and the power supply controller 11_2 of the touch controller 1_2 further has a function of operating the touch power supply circuit 2_2 by the timing controller 10_2 with low power consumption for a fixed period.

In case that switching from the display driving period to the non-display driving period is performed by the control of the timing controller 10_1, the display driver 1_1 sets the display driving power supply 2_1 to be in a low power consumption state, and transmits a horizontal synchronizing signal DISP_HSYNC to the touch controller 1_2 through the synchronizing circuit 9_1. In case that DISP_HSYNC is received in the synchronizing circuit 9_2, for example, at time t11, the touch controller 1_2 releases the low power consumption state of the touch controller power supply 2_2 at time t12 after HSYNC asynchronous transfer time $T_{async}$, and starts touch sensing. After the termination of touch sensing at time t13, the touch controller power supply 2_2 is set to be in a low power consumption state. In this case, in case that the display driver 1_1 and the touch controller 1_2 are formed in separate chips, a constant sensing termination margin $T_{margin}$ may be secured until display driving is started from the termination of touch sensing.

The touch sensor power supply 2_2 is operated with low power consumption in the display driving period, and the display power supply 2_1 is operated with low power consumption in the non-display driving period in case that touch sensing is performed. The low consumption driving period can be adjusted within the ranges of the display driving period and the non-display driving period, and the low power consumption operation can be realized by various methods. The low power consumption operation of the display power supply circuit 2_1 is realized by either of the cutoff of a bias current or the reduction of the amount of a current, the stop of the regulators 15_1 and 15_2 or the stop of the amplifier, the stop of the DCDC converters 13_1 to 13_3, the fixation of a switch operation to a certain state, the decrease of the frequency of a boost clock, or the like, or by a combination thereof. The low power consumption operation of the touch power supply circuit 2_2 is realized by either of the cutoff of a bias current or the reduction of the amount of a current, the stop of the regulator 15_3 or the stop of the amplifiers 16_3 and 16_4, the stop of the DCDC converters 13_4 and 13_5, the fixation of a switch operation to a certain state, the decrease of the frequency of a boost clock, the stop of the touch detection signal driver 19, the stop of the AD conversion circuit 21, or the like, or by a combination thereof.

FIGS. 4 and 5 show an example thereof. In the display driving periods (t2 to t3, t4 to t5, t6 to t7, and t8 to t9), on the display driver 1_1 side, the biases of the amplifiers 15_1 and 15_2 and the regulators 15_1 and 15_2 are set to be 100%, and the boost clock of the DCDC converters 13_1 to 13_3 is also set to be a highest frequency. On the other hand, on the touch controller 1_2 side, the bias of the AD conversion circuit 21 is reduced to 10%, the bias of the touch state detection circuit 20 is reduced to 0%, the bias of the amplifier 3 (16_3) is reduced to 10%, the bias of the amplifier 4 (16_4) is reduced to 0%, and the bias of the regulator 3 (15_3) is reduced to 50%, and the frequency of the boost clock of the DCDC converters 13_4 and 13_5 is also controlled to a frequency lower than that in the sensing period. In the non-display driving periods (t1 to t2, t3 to t4, t5 to t6, and t7 to t8), on the display driver 1_1 side, the bias of the amplifier 1 (15_1) is reduced to 10%, the bias of the amplifier 2 (15_2) is reduced to 30%, and the biases of the regulators 1 and 2 (15_1 and 15_2) are reduced to 30% and 50%, respectively. The frequency of the boost clock of the DCDC converter 1 (13_1) is decreased, and the level of the boost clock of the DCDC converters 2 and 3 (13_2 and 13_3) is fixed. Thereby, a boosting operation is stopped. In case that a capacitor connected to a power supply is charged with charge even though the boosting operation is stopped, more than a constant voltage is maintained. In case that it is assured that more than a predetermined voltage is maintained in a period until the boosting operation is resumed, the boosting operation may be stopped. On the other hand, on the touch controller 1_2 side, the biases of the AD conversion circuit 21, the touch state detection circuit 20, the amplifiers 16_3 and 16_4, and the regulator 15_3 are set to be 100%, and the frequency of the boost clock of the DCDC converters 13_4 and 13_5 is also set to be a highest frequency. A touch detection pattern is output from the touch detection signal driver 19, and accordingly, an analog waveform of a touch detection result is input to the touch state detection circuit 20. The analog waveform of the touch detection result is, for example, a waveform in which an attenuation coefficient changes by the capacitance of a capacitor formed on the touch panel changing due to pressure. It is possible to detect a touch state by sampling a peak value after a predetermined time. However, the above is merely illustrative, and the realization form of the touch sensor is arbitrary. In the display driving period, the touch detection pattern is not output, and it is not necessary to receive a touch detection result waveform. Therefore, power consumption is reduced by stopping the operations of the touch detection signal driver 19, the touch state detection circuit 20, the AD conversion circuit 21, and the touch position discrimination circuit 22. Specifically, a bias current flowing through the driver and circuits is decreased, and power supply capability for the driver and circuits is decreased. Even in case that power supply capability is maintained just by decreasing a bias current, power consumption is reduced by an amount corresponding to the decreased bias current. Even in case that power supply capability is decreased in a state where the bias current is not changed, the power consumption of the power supply circuit is reduced. Therefore, the power consumption of the display driver 1_1 in that period can be kept low.

The power supply capability of the DCDC converter can also be controlled by the duty of a boost clock, in addition to the frequency of a boost clock. In case that a capacitor is charged in a high period of a boost clock and boosting in a low period is performed, it is possible to decrease the amount of charge accumulated in the capacitor by shortening the high period, and to decrease current supply capability. Here, current supply capability and power supply capability are used synonymously with each other, and show current values or power values of a power source which is output from the power supply circuit such as the DCDC converter. The relationship between the high period and the low period is determined by a circuit configuration, and may be reversed. In an example of FIG. 5, in the clock of the DCDC converter 1 (13_1), the magnitudes of a high pulse are the same as each other in the display driving period and the non-display driving period. However, a clock the duty of which is reduced by thinning out a pulse in the non-display driving period is generated and supplied, and thus power supply capability is reduced. Thereby, the power consumption of the DCDC converter itself or the supply circuit of a boost clock can be kept to the minimum necessary. It is possible to change the power supply capability of the DCDC converter with high speed and efficiency by changing the frequency and the duty of the boost clock of the DCDC converter. It takes time to gradually change a clock frequency until stabilization. However, according to thinning out or frequency division of a pulse, the clock frequency can be changed instantaneously without producing an unstable period. Further, it is possible to reduce noise generated due to a boost clock. In First Embodiment, an example is illustrated in which the display driver 1_1 and the touch controller 1_2 are formed in separate chips. There is a concern that the noise caused by the boost clock of the DCDC converter on the display driver 1_1 side may be propagated to the touch controller 1_2 through power supply wiring or control wiring, and that the S/N ratio of the touch state detection circuit 20 is deteriorated. However, since the boost clock of the power supply circuit 2_1 of the display driver 1_1 is suppressed to a low frequency or duty during the sensing period, the noise to be generated is also kept low. Thereby, it is possible to improve the S/N ratio of touch sensing in the touch controller 1_2.

A plurality of DCDC converters and a plurality of regulators are included, and the power supply circuit is formed by a combination thereof, thereby allowing power supply capability to be finely controlled. For example, in an example of FIG. 4, the DCDC converter 1 (13_1) can be configured to generate an internal power source from a power source which is supplied from the outside, and the DCDC converters 2 and 3 (13_2 and 13_3) can be configured to generate another internal power source (for example, having positive and negative polarities at higher pressure) from the internal power source. The DCDC converter 1 (13_1) continues an operation by decreasing the frequency of a boost clock even in the non-display driving period, but the DCDC converters 2 and 3 (13_2 and 13_3) stop operations. The output of the DCDC converter 1 (13_1) causes the supply of power to a circuit, such as the bias control circuit 3_1, which is not able to completely stop an operation to be performed, and the output of the DCDC converters 2 and 3 (13_2 and 13_3) causes the supply of power to a circuit, such as the source amplifier 17 and the level shifter 18, which stops an operation in the non-display driving period to be performed. The boost clocks of the DCDC converters 2 and 3 (13_2 and 13_3) exemplified in FIGS. 4 and 5 are clock having reverse phases to each other, and are suitable for a case where positive-negative symmetric voltages, for example, are generated. The phases of time at which mutual current consumptions become a peak are deviated by 180 degrees due to the reversed phase, thereby allowing the sum of peak currents of the DCDC converters 2 and 3 (13_2 and 13_3), that is, the entire peak current to be suppressed.

The time division periods of the display driving period and the non-display driving period or the sensing period may be specified using the image line as a unit. Display and touch sensing may be repeated for each line, and touch sensing may be performed after the lines of the entirety of one frame are displayed. More preferably, the number of appropriate lines may be obtained on the basis of the number of electrodes of the display panel 6. By using the line as a unit, the display driver 1_1 and the touch controller 1_2 can synchronize with each other using a horizontal synchronizing signal DISP_HSYNC for displaying.

(Second Embodiment)

First Embodiment is an embodiment in which the display driver 1_1 and the touch controller 1_2 are formed in so-called separate chips. On the other hand, Second Embodiment is an embodiment using a so-called combo chip in which the display driver and the touch controller are formed integrally with each other.

Figure 6:
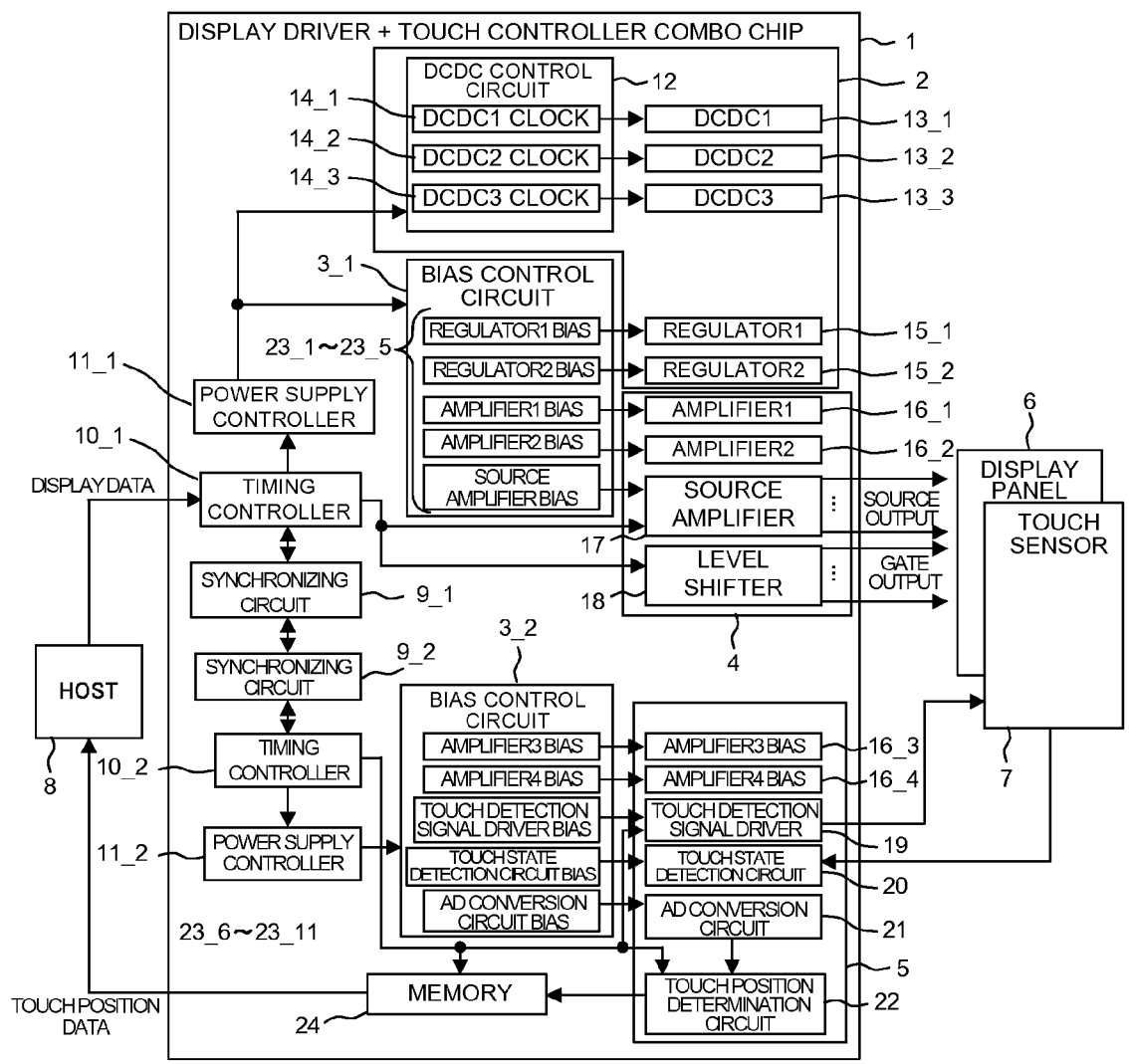
FIG. 6 is a block diagram illustrating a configuration of a semiconductor device according to Second Embodiment.

FIG. 6 is a block diagram illustrating a configuration of a semiconductor device according to Second Embodiment. A combo chip 1 which integrally includes a display driver and a touch controller is formed on one semiconductor substrate by, for example, a CMOS integrated circuit manufacturing technique or the like. The combo chip 1 outputs driving signals (source output signal, gate output signal and the like) for displaying display data which is input from a host 8 on a display panel 6, and receives a touch detection signal from a touch sensor 7. The configurations of the display panel 6 and the touch sensor 7 are the same as those in First Embodiment. The combo chip 1 includes a driving circuit 4, a touch sensing circuit 5, a display driver bias control circuit 3_1, a touch controller bias control circuit 3_2, synchronous circuits 9_1 and 9_2, timing controllers 10_1 and 10_2, and a memory 24. These components are the same as those in First Embodiment shown in FIG. 3. The combo chip 1 further includes a power supply circuit 2 and power supply controller 11_1 and 11_2. The power supply circuit 2 is configured such that the display driver power supply circuit 2_1 and the touch controller power supply circuit 2_2 of First Embodiment are integrated with each other, and the circuit scale is reduced by use in common. The DCDC converter 2 (13_2) performs the supply of power to the touch sensing circuit 4 and the like, instead of the DCDC converters 4 and 5 (13_4 and 13_5). Thereby, it is possible to reduce two circuits of the DCDC converters. The supply of power to the touch sensing circuit 4 and the like may be performed from both the DCDC converters 2 and 3 (13_2 and 13_3), instead of the DCDC converters 4 and 5 (134 and 13_5). As is the case with the DCDC converters 2 and 3 (13_2 and 13_3), the DCDC converters 4 and 5 (13_4 and 13_5) are DCDC converters operating at a complementary boost clock, and thus are replaced with good consistency. The power supply controller 11_1 performs timing control of the power supply circuit 2 and timing control of the display driver bias control circuit 3_1, and the power supply controller 11_2 performs timing control of only the touch controller bias control circuit 3_2.

An example is illustrated in which the synchronizing circuits 9_1 and 9_2, the timing controllers 10_1 and 10_2, the power supply controllers 11_1 and 11_2, and the bias control circuits 3_1 and 3_2 are provided independently from each other. Thereby, it is possible to divert design properties which are originally mounted to the display driver and the touch controller, to shorten a design development period, and to suppress a design cost. On the other hand, common circuits included in respective components can be shared and formed integrally with each other. In this case, it is possible to reduce a circuit scale, to perform originally asynchronous circuit operations of the display driver and the touch controller using a synchronizing circuit, and to reduce a waste of timing associated with the transmission and reception of an asynchronous signal.

An operation example of the semiconductor device (combo chip 1) according to Second Embodiment will be described below.

Figure 7:
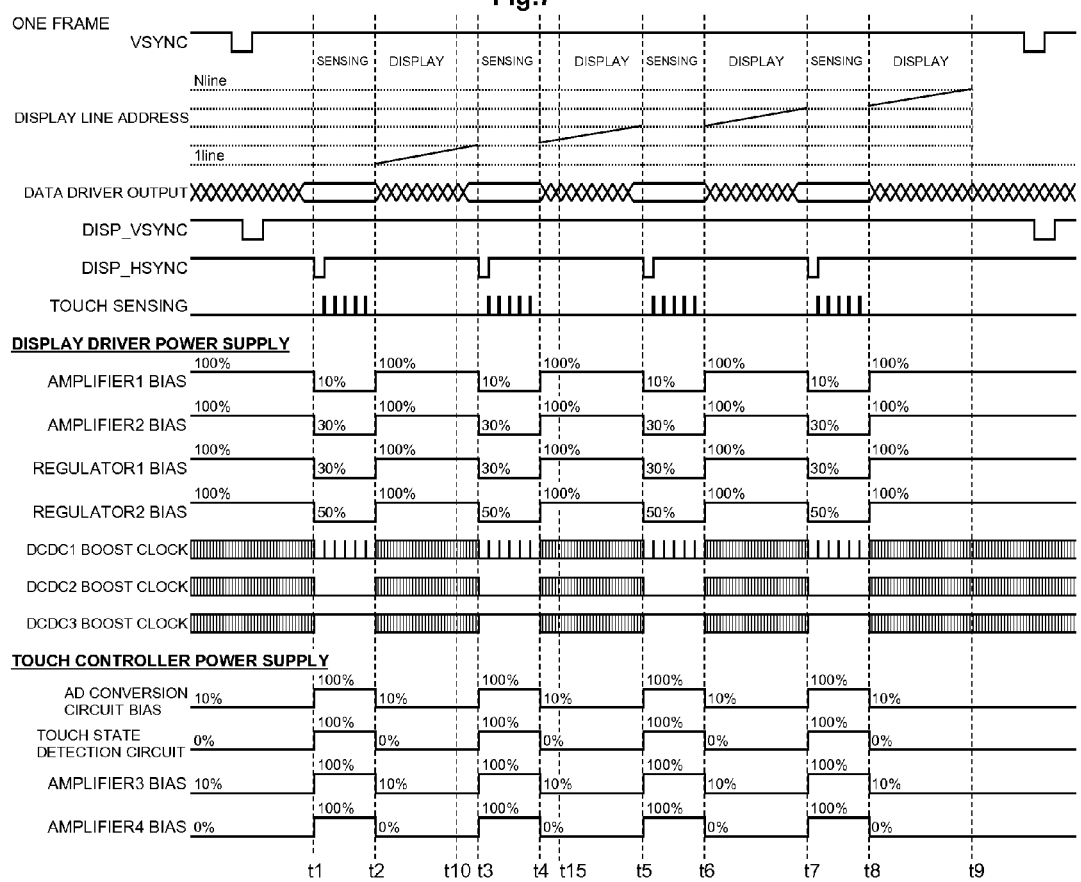
FIG. 7 is a timing diagram illustrating an operation example of a semiconductor device according to Second Embodiment.
Figure 8:
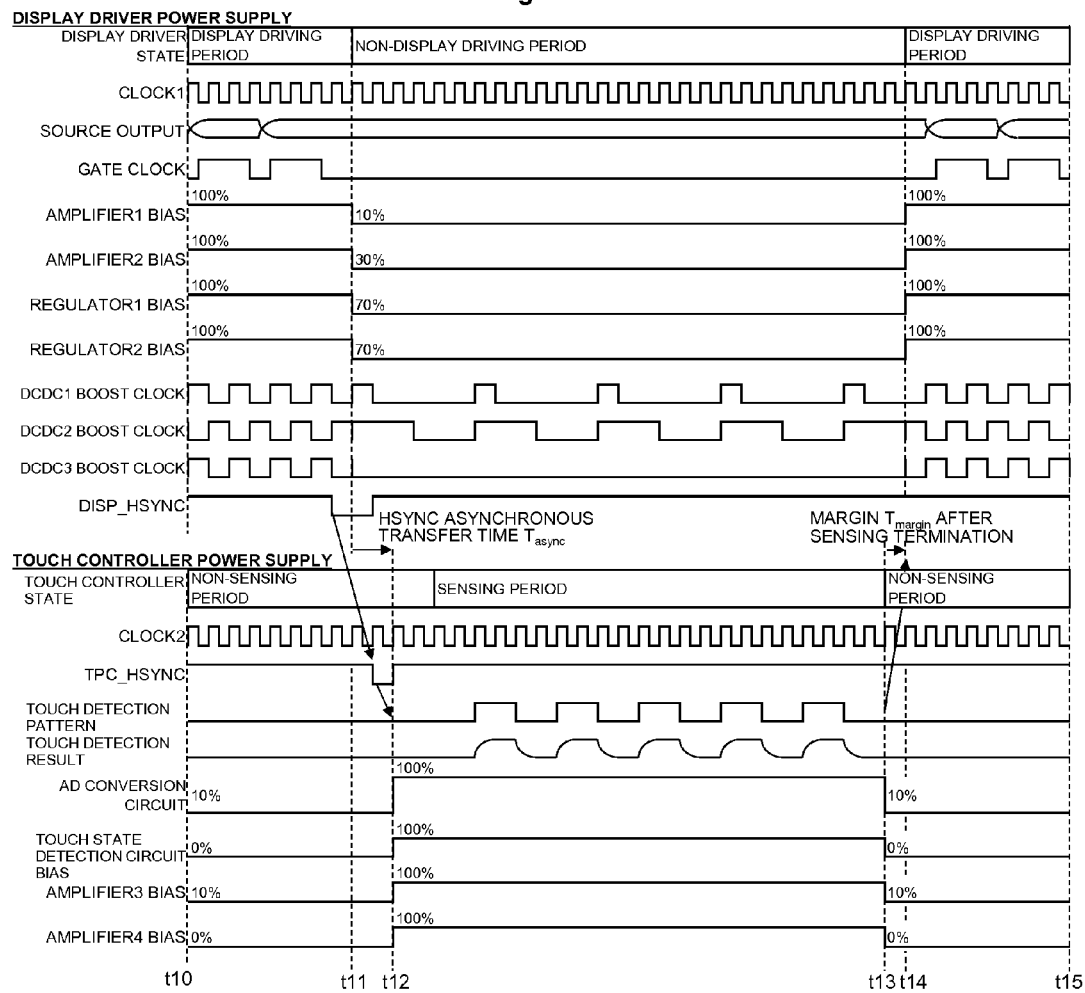
FIG. 8 is an enlarged timing diagram of a portion of FIG. 7.

FIG. 7 is a timing diagram illustrating an operation example of the semiconductor device according to Second Embodiment, and FIG. 8 is an enlarged timing diagram of a portion of FIG. 7 (times t10 to t15).

In the semiconductor device (combo chip 1), the timing controllers 9_1 and 9_2 synchronize with each other by transmitting and receiving a horizontal synchronizing signal DISP_HSYNC, and performs display driving and touch sensing in a time-division manner as is the case with First Embodiment shown in FIGS. 4 and 5. As is the case with First Embodiment shown in FIGS. 4 and 5, a reduction in power consumption is performed on the touch sensing circuit 5 in the display driving period, and a reduction in power consumption is performed on the driving circuit 4 in the sensing period. The DCDC converter 3 (13_3) supplies a power source to only the driving circuit 4, and thus can stop an operation in the sensing period as is the case with First Embodiment. However, the DCDC converter 2 (13_2) supplies a power source to the driving circuit 4 and the touch sensing circuit 5 through use in common, and thus is not able to stop an operation even in the sensing period. However, since the power consumption of the touch sensing circuit 5 is lower than that of the driving circuit 4, power supply capability is reduced to conform thereto. As shown in FIG. 8, power supply capability is reduced by decreasing the frequency of the boost clock of the DCDC converter 2. The same is true of the regulators 1 and 2 (15_1 and 15_2). Through use in common, the regulators 1 and 2 (15_1 and 15_2) perform the supply of power to the touch sensing circuit 5 and the like instead of the regulator 3, and thus is not able to stop an operation even in the sensing period. However, power supply capability is made to be proper by reducing a bias current up to 70%.

In case that switching from the display driving period to the non-display driving period is performed, the driving circuit 4 is set to be in a low power consumption state, and a horizontal synchronizing signal DISP_HSYNC is transmitted to the timing controller 10_2 on the touch controller side through the synchronizing circuit 9_1. In case that DISP_HSYNC is received, the synchronizing circuit on the touch controller side releases the low power consumption state of the touch sensing circuit 5 after HSYNC asynchronous transfer time $T_{async}$, and starts touch sensing. After the termination of touch sensing, the touch sensing circuit 5 is set to be in a low power consumption state. In this case, in case that the display driver side and the touch controller side are designed asynchronously, it is necessary to secure a constant sensing termination margin $T_{margin}$, but a synchronous timing design is facilitated in the combo chip 1. Therefore, there is an advantage that $T_{async}$ and $T_{margin}$ can be made to be smaller than in a separate chip, and more time can be allocated to touch sensing and display driving. Further, the synchronizing circuits 9_1 and 9_2, the timing controllers 10_1 and 10_2, the power supply controllers 11_1 and 11_2, and the bias control circuits 3_1 and 3_2 are formed integrally with each other, and thus can also be formed as a synchronizing circuit. In this case, it is possible to eliminate or remarkably reduce $T_{async}$ and $T_{margin}$ which are margins of timing associated with the transmission and reception of an asynchronous signal.

The same method as that shown in First Embodiment can be adopted with respect to the low power consumption operations other than the above.

Thereby, in the display driving period, the supply of power to the touch sensing circuit 5 in a waiting state can be kept low, and/or the bias current of the touch sensing circuit 5 can be reduced. On the other hand, in the sensing period, the supply of power to the driving circuit 4 in a waiting state can be kept low, and/or the bias current of the driving circuit 4 can be reduced. Therefore, the power consumption of the entire semiconductor device (combo chip 1) can be kept low.

(Third Embodiment)

First and Second Embodiments are embodiments in which the display driver and the touch controller are brought into operation in a time-division manner. On the other hand, Third Embodiment is an embodiment in which the present invention is applied to the display driver operating intermittently.

Figure 9:
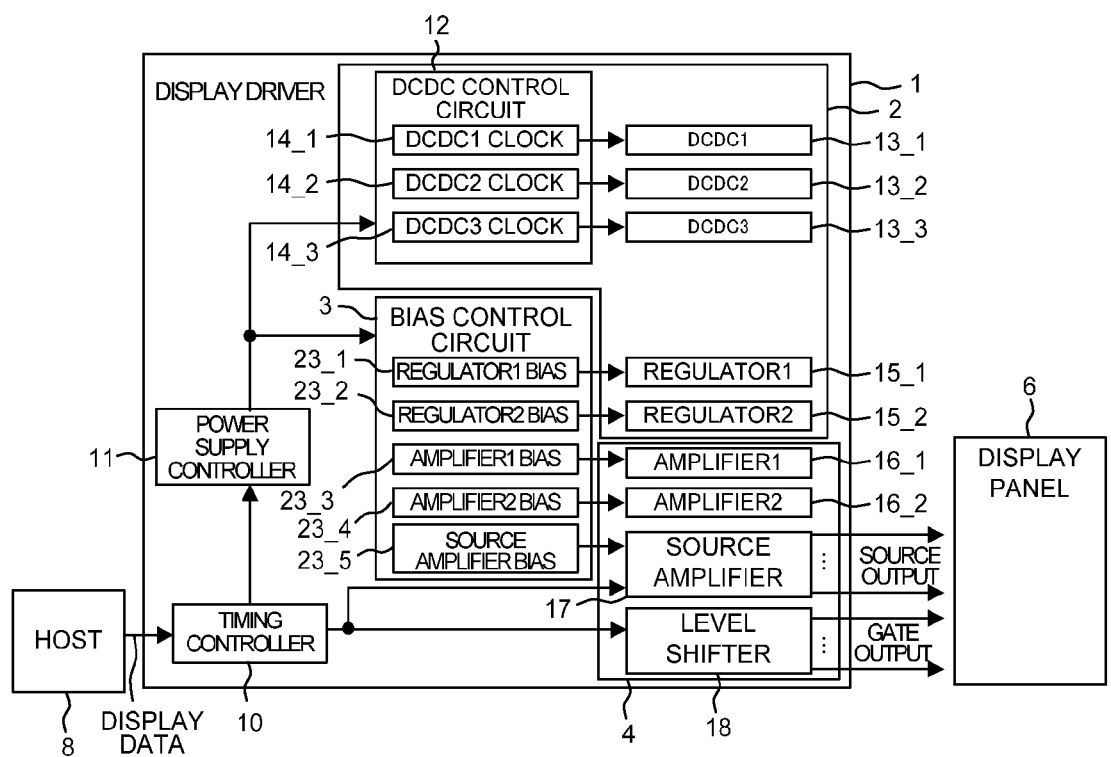
FIG. 9 is a block diagram illustrating a configuration of a semiconductor device according to Third Embodiment.

FIG. 9 is a block diagram illustrating a configuration of a semiconductor device (display driver 1) according to Third Embodiment. The display driver 1 is formed on one semiconductor substrate by, for example, a CMOS integrated circuit manufacturing technique or the like. The display driver 1 outputs a driving signal for displaying display data which is input from a host 8 on a display panel 6. The configuration of the display panel 6 is the same as that in First Embodiment, and a touch sensor may be incorporated in an on-cell type or an in-cell type. The display driver 1 includes a power supply circuit 2, a driving circuit 4, a bias control circuit 3, a timing controller 10, and a power supply controller 11. The power supply controller 11 has a function of operating the power supply circuit 2 for a fixed period with low power consumption through the control of the timing controller 10. These components are the same as those in First Embodiment shown in FIG. 3.

An operation example of the semiconductor device (display driver 1) according to Third Embodiment will be described below.

Figure 10:
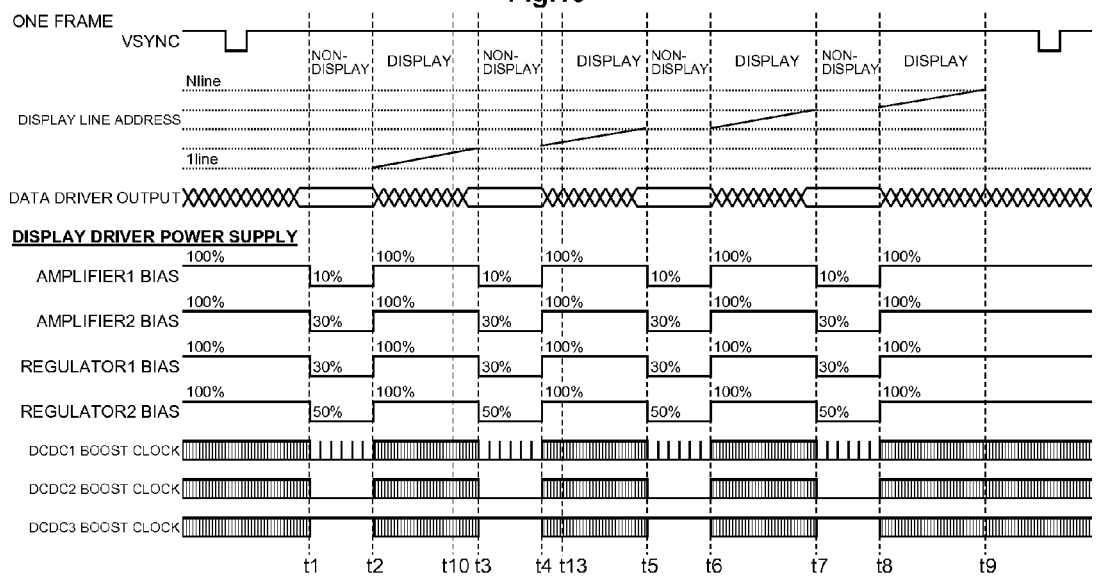
FIG. 10 is a timing diagram illustrating an operation example of a semiconductor device according to Third Embodiment.
Figure 11:
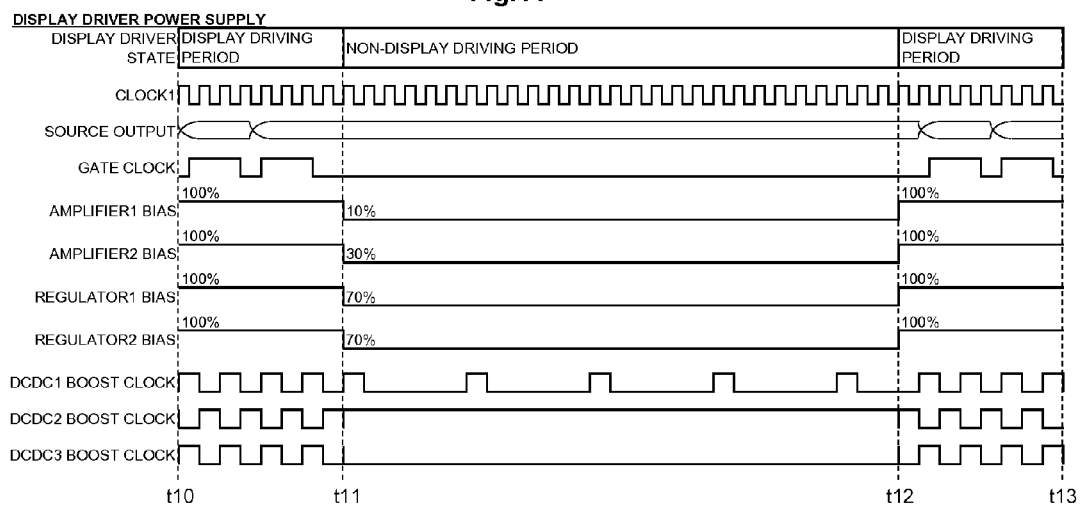
FIG. 11 is an enlarged timing diagram of a portion of FIG. 10.

FIG. 10 is a timing diagram illustrating an operation example of the semiconductor device (display driver 1) according to Third Embodiment, and FIG. 11 is an enlarged timing diagram of a portion of FIG. 10 (times t10 to t13).

The semiconductor device (display driver 1) performs display driving intermittently for each of several lines, similarly to the time-division operation of First Embodiment shown in FIGS. 4 and 5 through the control of the timing controller 10, generates display driving periods and non-display driving periods, and performs display driving intermittently.

In the display driving periods (t2 to t3, t4 to t5, t6 to t7, and t8 to t9), the biases of amplifiers 15_1 and 15_2 and regulators 15_1 and 15_2 are set to be 100%, and the boost clock of DCDC converters 13_1 to 13_3 is also set to be a highest frequency. In the non-display driving periods (t1 to t2, t3 to t4, t5 to t6, and t7 to t8), a display power supply is driven with low power consumption. In the non-display driving periods, the biases of the amplifiers 1 and 2 (15_1 and 15_2) are reduced to 10% and 30%, respectively, and the biases of the regulators 1 and 2 (15_1 and 15_2) are reduced to 30% and 50%, respectively. The frequency of the boost clock of the DCDC converter 1 (13_1) is decreased, and the level of the boost clock of the DCDC converters 2 and 3 (13_2 and 13_3) is fixed. Thereby, a boosting operation is stopped.

Since display driving is performed intermittently by the display driver 1 to generate a non-display driving period, and an power supply operation in this period is controlled, it is possible to perform a reduction in power consumption without deteriorating display quality.

A period on which a reduction in power consumption is performed can be adjusted within the range of the non-display driving period. In addition, a method of a reduction in power consumption in this period can also be adjusted. The method of a reduction in power consumption can be realized, in addition to the above-mentioned example, by any method of the cutoff of a bias current by the bias control circuit 3 or the reduction of the amount of a current, the stop of the regulators 15_1 and 15_2 or the stop of the amplifiers 16_1 and 16_2, the stop of the DCDC converter 13_1 to 13_3, the fixation of a switch operation to a certain state, or the decrease of an operating frequency, or by a combination thereof.

As stated above, while the present invention devised by the inventor has been described in detail based on the embodiments, the present invention is not limited thereto. It goes without saying that various modifications and changes can be made without departing from the scope of the invention.

As described previously, for example, the display panel may be an organic electroluminescent panel, a plasma display, and any other kinds of display panels without being limited to a liquid crystal display panel. In addition, the touch sensor may be any kinds of sensing types without being limited to a type that detects a change in capacity. Further, the display panel and the touch sensor may be an on-cell type without being limited to an in-cell type.

In addition, a period of a reduction in power consumption, a target circuit, a method of a reduction in power consumption, and the like can be appropriately adjusted. For example, while the temporal sensitivity of touch sensing can be improved by making a unit of time division finer, the control speed of a reduction in power consumption requires rapidity.

What is claimed is:

1. A semiconductor device capable of being connected to a display panel including a touch sensor,
wherein the display panel is a liquid crystal display panel, and
wherein the touch sensor is formed integrally with the liquid crystal display panel in an in-cell type using an arrangement of capacitors, and can detect a touch state and a position by detecting a change in capacitance,
the semiconductor device comprising:
a driving circuit configured to drive the liquid crystal display panel;
a touch sensing circuit configured to be connected to the integrally-formed touch sensor;
a power supply circuit that supplies a power source to the liquid crystal driving circuit and the touch sensing circuit; and
a bias control circuit that supplies a first control signal to the driving circuit to control a first bias current flowing through the liquid crystal driving circuit and a second control signal to the touch sensing circuit to control a second bias current flowing through the touch sensing circuit, the second control signal being separate and independent from the first control signal,
wherein the semiconductor device is able to perform a time-division operation including a display driving period in which the liquid crystal display panel is driven and a touch state is not detected and a sensing period in which a touch state is detected and a driving state of the liquid crystal display panel is not changed,
one or more display driving period and one or more sensing periods are included in one frame period of an image which is displayed by the liquid crystal display panel,
in the display driving period, the power supply circuit reduces power supply capability to the touch sensing circuit further than that in the sensing period, and/or the bias control circuit reduces the second bias current further than that in the sensing period by controlling a signal level output of the second control signal, and
in the sensing period, the power supply circuit reduces power supply capability to the liquid crystal driving circuit further than that in the display driving period, and/or the bias control circuit reduces the first bias current further than that in the display driving period by controlling a signal level output of the first control signal.

2. The semiconductor device according to claim 1,
the power supply circuit includes a first DCDC converter that generates a first internal power source from a power source which is supplied from an outside, a second DCDC converter that generates a second internal power source from the first internal power source, and a third DCDC converter that generates a third internal power source from the first internal power source,
the power supply circuit includes a first regulator that outputs a second stabilized power source, supplied to the driving circuit and the touch sensing circuit, from the second internal power source, and a second regulator that outputs a third stabilized power source, which is supplied to the driving circuit and is not supplied to the touch sensing circuit, from the third internal power source,
each of the first, second and third DCDC converters is configured to improve power supply capability by increasing a frequency and/or duty of a boost clock, and to reduce power supply capability by decreasing the frequency and/or duty thereof,
the first regulator is configured to improve power supply capability by increasing a third bias current controlled by the bias control circuit, and to reduce power supply capability by decreasing the third bias current,
the second regulator is configured to improve power supply capability by increasing a fourth bias current controlled by the bias control circuit, to reduce power supply capability by decreasing the fourth bias current, or to cut off a supply of power, and
in the sensing period, the power supply circuit reduces power supply capability by decreasing a frequency and/or duty of a boost clock of the first DCDC converter and the second DCDC converter and stops an operation of the third DCDC converter, and the bias control circuit stops a supply of power from the second regulator to the driving circuit by decreasing the fourth bias current.

3. The semiconductor device according to claim 2,
wherein the liquid crystal display panel is able to display an image frame constituted by a plurality of lines,
the display driving period is a period in which some of a plurality of lines within the image frame are displayed, and
the sensing period is set to an arbitrary period between the display driving period and a next display driving period.

4. The semiconductor device according to claim 3, wherein
the liquid crystal display panel is able to display an image frame constituted by a plurality of lines,
the display driving period is a period in which some of a plurality of lines within the image frame are displayed, and
the waiting period is set to an arbitrary period between the display driving period and a next display driving period.

5. The semiconductor device according to claim 1, wherein
the liquid crystal display panel is able to display an image frame constituted by a plurality of lines,
the display driving period is a period in which some of a plurality of lines within the image frame are displayed, and
the sensing period is set to an arbitrary period between the display driving period and a next display driving period.

6. A semiconductor device capable of being connected to a display panel including a touch sensor, comprising:
a driving circuit configured to drive the display panel;
a touch sensing circuit configured to be connected to the touch sensor;
a power supply circuit that supplies a power source to the driving circuit and the touch sensing circuit; and a bias control circuit that controls a first bias current flowing through the driving circuit and a second bias current flowing through the touch sensing circuit, wherein the semiconductor device is able to perform a time-division operation including a display driving period in which the display panel is driven and a touch state is not detected and a sensing period in which a touch state is detected and a driving state of the display panel is not changed, one or more display driving period and one or more sensing periods are included in one frame period of an image which is displayed by the display panel, in the display driving period, the power supply circuit reduces power supply capability to the touch sensing circuit further than that in the sensing period, and/or the bias control circuit reduces the second bias current further than that in the sensing period, in the sensing period, the power supply circuit reduces power supply capability to the driving circuit further than that in the display driving period, and/or the bias control circuit reduces the first bias current further than that in the display driving period, the power supply circuit includes a DCDC converter that generates an internal power source from a power source which is supplied from an outside, a first regulator that outputs a first stabilized power source, supplied to the driving circuit, from the internal power source, a second regulator that outputs a second stabilized power source, supplied to the touch sensing circuit, from the internal power source, the DCDC converter is configured to improve power supply capability by increasing a frequency of a boost clock, and to reduce power supply capability by decreasing the frequency thereof, the first regulator is configured to improve power supply capability by increasing a third bias current controlled by the bias control circuit, and to reduce power supply capability by decreasing the third bias current, the second regulator is configured to improve power supply capability by increasing a fourth bias current controlled by the bias control circuit, and to reduce power supply capability by decreasing the fourth bias current, in the display driving period, the power supply circuit decreases the frequency of the DCDC converter further than that in the sensing period, and the bias control circuit reduces the fourth bias current and the second bias current further than those in the sensing period, and in the sensing period, the power supply circuit controls decreasing the frequency of the DCDC converter further than that in the display driving period, and the bias control circuit controls reducing the third bias current and the first bias current further than those in the display driving period.

7. The semiconductor device according to claim 6, wherein the display panel is able to display an image frame constituted by a plurality of lines, the display driving period is a period in which some of a plurality of lines within the image frame are displayed, and the sensing period is set to an arbitrary period between the display driving period and a next display driving period.

8. The semiconductor device according to claim 7, wherein the display panel is able to display an image frame constituted by a plurality of lines, the display driving period is a period in which some of a plurality of lines within the image frame are displayed, and the waiting period is set to an arbitrary period between the display driving period and a next display driving period.

9. A semiconductor device capable of being connected to a display panel including a touch sensor, comprising:

a driving circuit configured to drive the display panel;

a touch sensing circuit configured to be connected to the touch sensor;

a power supply circuit that supplies a power source to the driving circuit and the touch sensing circuit; and a bias control circuit that controls a first bias current flowing through the driving circuit and a second bias current flowing through the touch sensing circuit, wherein the semiconductor device is able to perform a time-division operation including a display driving period in which the display panel is driven and a touch state is not detected and a sensing period in which a touch state is detected and a driving state of the display panel is not changed, one or more display driving period and one or more sensing periods are included in one frame period of an image which is displayed by the display panel, in the display driving period, the power supply circuit reduces power supply capability to the touch sensing circuit further than that in the sensing period, and/or the bias control circuit reduces the second bias current further than that in the sensing period, in the sensing period, the power supply circuit reduces power supply capability to the driving circuit further than that in the display driving period, and/or the bias control circuit reduces the first bias current further than that in the display driving period, the power supply circuit includes a DCDC converter that generates an internal power source from a power source which is supplied from an outside, a first regulator that outputs a first stabilized power source, supplied to the driving circuit, from the internal power source, a second regulator that outputs a second stabilized power source, supplied to the touch sensing circuit, from the internal power source, the DCDC converter is configured to improve power supply capability by increasing a duty of a boost clock, and to reduce power supply capability by decreasing the duty thereof, the first regulator is configured to improve power supply capability by increasing a third bias current controlled by the bias control circuit, and to reduce power supply capability by decreasing the third bias current, the second regulator is configured to improve power supply capability by increasing a fourth bias current controlled by the bias control circuit, and to reduce power supply capability by decreasing the fourth bias current, in the display driving period, the power supply circuit controls decreasing the duty of the DCDC converter further than that in the sensing period, and the bias control circuit controls reducing the fourth bias current and the second bias current further than those in the sensing period, and in the sensing period, the power supply circuit controls decreasing the duty of the DCDC converter further than that in the display driving period, and the bias control circuit controls reducing the third bias current and the first bias current further than those in the display driving period.

10. The semiconductor device according to claim 9, wherein the display panel is able to display an image frame constituted by a plurality of lines,
the display driving period is a period in which some of a plurality of lines within the image frame are displayed, and
the sensing period is set to an arbitrary period between the display driving period and a next display driving period.

11. The semiconductor device according to claim 10, wherein
the display panel is able to display an image frame constituted by a plurality of lines,
the display driving period is a period in which some of a plurality of lines within the image frame are displayed, and
the waiting period is set to an arbitrary period between the display driving period and a next display driving period.

12. A semiconductor device capable of connecting to a display panel, comprising:
a driving circuit configured to drive the display panel;
a power supply circuit that supplies a power source to the driving circuit; and
a bias control circuit that controls a bias current flowing through the driving circuit,
wherein
the semiconductor device is able to perform a time-division operation including a display driving period in which the display panel is driven and a waiting period in which a driving state is not changed,
one or more display driving periods and one or more waiting periods are included in one frame period of an image which is displayed by the display panel,
in the waiting period, the power supply circuit controls reducing power supply capability further than that in the display driving period, and/or the bias control circuit controls reducing the bias current further than that in the display driving period,
the power supply circuit includes a DCDC converter that generates an internal power source from a power source which is supplied from an outside, and a regulator that outputs a stabilized power source from the internal power source,
the DCDC converter is configured to improve power supply capability by increasing a frequency of a boost clock, and to reduce power supply capability by decreasing the frequency thereof,
the bias current is set to a first bias current,
the regulator is configured to improve power supply capability by increasing a second bias current controlled by the bias control circuit, and to reduce power supply capability by decreasing the second bias current, and
in the waiting period, the power supply circuit controls decreasing the frequency of the DCDC converter further than that in the display driving period, and the bias control circuit controls reducing the second bias current and the first bias current further than those in the display driving period.

13. The semiconductor device according to claim 12, wherein
the display panel is able to display an image frame constituted by a plurality of lines,
the display driving period is a period in which some of a plurality of lines within the image frame are displayed, and
the waiting period is set to an arbitrary period between the display driving period and a next display driving period.

14. A semiconductor device capable of connecting to a display panel, comprising:
a driving circuit configured to drive the display panel;
a power supply circuit that supplies a power source to the driving circuit; and
a bias control circuit that controls a bias current flowing through the driving circuit,
wherein
the semiconductor device is able to perform a time-division operation including a display driving period in which the display panel is driven and a waiting period in which a driving state is not changed,
one or more display driving periods and one or more waiting periods are included in one frame period of an image which is displayed by the display panel,
in the waiting period, the power supply circuit controls reducing power supply capability further than that in the display driving period, and/or the bias control circuit controls reducing the bias current further than that in the display driving period,
the power supply circuit includes a DCDC converter that generates an internal power source from a power source which is supplied from an outside, and a regulator that outputs a stabilized power source from the internal power source,
the DCDC converter is configured to improve power supply capability by increasing a duty of a boost clock, and to reduce power supply capability by decreasing the duty thereof,
the bias current is set to a first bias current,
the regulator is configured to improve power supply capability by increasing a second bias current controlled by the bias control circuit, and to reduce power supply capability by decreasing the second bias current, and
in the waiting period, the power supply circuit controls decreasing the duty of the DCDC converter further than that in the display driving period, and the bias control circuit controls reducing the second bias current and the first bias current further than those in the display driving period.

15. A semiconductor device capable of connecting to a display panel,
wherein the display panel is a liquid crystal display panel, and
wherein the touch sensor is formed integrally with the liquid crystal display panel in an in-cell type using an arrangement of capacitors, and can detect a touch state and a position by detecting a change in capacitance,
the semiconductor device comprising:
a driving circuit configured to drive the liquid crystal display panel;
a power supply circuit that supplies a power source to the driving circuit; and
a bias control circuit that supplies a first control signal to the driving circuit to control a bias current flowing through the driving circuit,
wherein the semiconductor device is able to perform a time-division operation including a display driving period in which the liquid crystal display panel is driven and a waiting period in which a driving state is not changed, wherein one or more display driving periods and one or more waiting periods are included in one frame period of an image which is displayed by the liquid crystal display panel, wherein, in the waiting period, the power supply circuit controls reducing power supply capability further than that in the display driving period, and/or the bias control circuit controls reducing the bias current further than that in the display driving period, by controlling a signal level output of the first control signal, wherein the power supply circuit includes a DCDC converter that generates an internal power source from a power source which is supplied from an outside, and a regulator that outputs a stabilized power source from the internal power source, wherein the DCDC converter is configured to improve power supply capability by increasing a frequency or a duty of a boost clock, and to reduce power supply capability by decreasing the frequency or the duty thereof, wherein the bias current is set to a first bias current, wherein the regulator is configured to improve power supply capability by increasing a second bias current controlled by the bias control circuit, and to reduce power supply capability by decreasing the second bias current, and wherein, in the waiting period, the power supply circuit controls fixing a signal level of the boost clock of the DCDC converter, and the bias control circuit controls reducing the second bias current and the first bias current further than those in the display driving period.

16. The semiconductor device according to claim 15, wherein the liquid crystal display panel is able to display an image frame constituted by a plurality of lines, the display driving period is a period in which some of a plurality of lines within the image frame are displayed, and the waiting period is set to an arbitrary period between the display driving period and a next display driving period.

17. A semiconductor device capable of connecting to a display panel, wherein the display panel is a liquid crystal display panel, and wherein the touch sensor is formed integrally with the liquid crystal display panel in an in-cell type using an arrangement of capacitors, and can detect a touch state and a position by detecting a change in capacitance, the semiconductor device comprising:

a driving circuit configured to drive the liquid crystal display panel;

a power supply circuit that supplies a power source to the driving circuit; and a bias control circuit that supplies a first control signal to the driving circuit to control a bias current flowing through the driving circuit, wherein the semiconductor device is able to perform a time-division operation including a display driving period in which the liquid crystal display panel is driven and a waiting period in which a driving state is not changed, wherein one or more display driving periods and one or more waiting periods are included in one frame period of an image which is displayed by the liquid crystal display panel, wherein, in the waiting period, the power supply circuit controls reducing power supply capability further than that in the display driving period, and/or the bias control circuit controls reducing the bias current further than that in the display driving period, by controlling a signal level output of the first control signal, wherein the power supply circuit includes a first DCDC converter that generates a first internal power source from a power source which is supplied from an outside, a second DCDC converter that generates a second internal power source from the first internal power source, and a regulator that outputs a stabilized power source from the second internal power source, wherein each of the first and second DCDC converters is configured to improve power supply capability by increasing a frequency or a duty of a boost clock, and to reduce power supply capability by decreasing the frequency or the duty thereof, wherein the bias current is set to a first bias current, wherein the regulator is configured to improve power supply capability by increasing a second bias current controlled by the bias control circuit, and to reduce power supply capability by decreasing the second bias current, and wherein, in the waiting period, the power supply circuit controls decreasing the frequency of the first DCDC converter further than that in the display driving period, and/or decreasing the duty further than that in the display driving period, and fixing a signal level of the boost clock of the second DCDC converter, and the bias control circuit controls reducing the second bias current and the first bias current further than those in the display driving period.

18. The semiconductor device according to claim 17, wherein the liquid crystal display panel is able to display an image frame constituted by a plurality of lines, the display driving period is a period in which some of a plurality of lines within the image frame are displayed, and the waiting period is set to an arbitrary period between the display driving period and a next display driving period.

19. A semiconductor device capable of connecting a display panel including a touch sensor, comprising:

a touch sensing circuit which is configured to be connected to the touch sensor;

a power supply circuit that supplies a power source to the touch sensing circuit; and a bias control circuit that controls a bias current flowing through the touch sensing circuit, wherein the semiconductor device is able to perform a time-division operation including a sensing period in which a touch state is detected and a waiting period in which the touch state is not detected, one or more sensing periods and one or more waiting period are included in one frame period of an image which is displayed by the display panel, in the waiting period, the power supply circuit controls reducing power supply capability, and/or the bias control circuit controls reducing the bias current, the power supply circuit includes a DCDC converter that generates an internal power source from a power source which is supplied from an outside, and a regulator that outputs a stabilized power source from the internal power source, the DCDC converter is configured to improve power supply capability by increasing a frequency and/or duty of a boost clock, and to reduce power supply capability by decreasing the frequency and/or duty thereof, the bias current is set to a first bias current, the regulator is configured to improve power supply capability by increasing a second bias current controlled by the bias control circuit, and to reduce power supply capability by decreasing the second bias current, and in the waiting period, the power supply circuit controls decreasing the frequency and/or duty of the DCDC converter further than that in the display driving period, and the bias control circuit controls reducing the second bias current and the first bias current further than those in the display driving period.

* * * * *